(12) United States Patent
Harris

(10) Patent No.: US 8,073,430 B1
(45) Date of Patent: Dec. 6, 2011

(54) COMPRESSED AUDIO INFORMATION

(76) Inventor: Scott C. Harris, Rancho Santa Fe, CA (US)

( * ) Notice: Subject to any disclaimer, the term of this patent is extended or adjusted under 35 U.S.C. 154(b) by 365 days.

(21) Appl. No.: 11/775,861

(22) Filed: Jul. 10, 2007

Related U.S. Application Data

(60) Continuation of application No. 11/280,725, filed on Nov. 16, 2005, now Pat. No. 7,260,421, which is a division of application No. 10/064,519, filed on Jul. 23, 2002, now Pat. No. 7,096,187.

(51) Int. Cl.
*H04L 12/58* (2006.01)
*H04M 1/725* (2006.01)
*H04M 1/663* (2006.01)

(52) U.S. Cl. .................. 455/412.1; 455/414.1; 455/418; 455/419; 455/420; 455/550.1; 455/567; 380/200; 380/201; 380/203; 380/268; 380/284; 705/51; 705/57; 705/59

(58) Field of Classification Search ............... 455/412.1, 455/414.1, 418–420, 550.1, 567; 380/200, 380/201, 203, 268, 284; 705/51, 57, 59
See application file for complete search history.

(56) References Cited

U.S. PATENT DOCUMENTS

| | | | |
|---|---|---|---|
| 5,513,260 A | 4/1996 | Ryan | |
| 5,596,639 A | 1/1997 | Kikinis | |
| 5,757,908 A | 5/1998 | Cooper | |
| 6,006,241 A * | 12/1999 | Purnaveja et al. ............ | 715/205 |
| 6,167,136 A | 12/2000 | Chou | |
| 6,243,481 B1 * | 6/2001 | Tao ................................ | 382/100 |
| 6,526,287 B1 * | 2/2003 | Lee ............................. | 455/556.1 |
| 6,694,012 B1 * | 2/2004 | Posthuma ..................... | 379/393 |
| 6,760,442 B1 * | 7/2004 | Scott ............................. | 380/268 |
| 6,947,728 B2 * | 9/2005 | Tagawa et al. .............. | 455/414.1 |
| 6,963,877 B2 * | 11/2005 | Layeghi ........................ | 707/102 |
| 7,050,573 B2 | 5/2006 | Okazaki et al. | |
| 7,082,413 B2 | 7/2006 | Bell | |
| 7,188,087 B1 | 3/2007 | Goldstein | |
| 7,236,958 B2 | 6/2007 | Wong et al. | |
| 7,356,513 B2 | 4/2008 | Stebbings | |
| 7,379,760 B2 | 5/2008 | Ishii | |
| 7,386,127 B2 | 6/2008 | Bar-On | |
| 7,433,474 B2 | 10/2008 | Kato et al. | |
| 2003/0086547 A1 | 5/2003 | Chuang | |

* cited by examiner

*Primary Examiner* — Steve D Agosta
(74) *Attorney, Agent, or Firm* — Law Office of Scott C. Harris, Inc.

(57) ABSTRACT

Compressed entertainment content such as audio or video or both includes additional aspects and operations associated their way. The compressed audio may be used to signal computers such as a telephone or reminder for an appointment. A melody line may be extracted from the audio, or the audio may be used exactly as it is. Another aspect stores traders within the entertainment content such as in MP3. Those traders are used to trigger the system to retrieve other parts of the content to be displayed at the same time that that particular part of the MP3 is being play. The content may include video or text, or maybe links to other content such as broadband content four times sensitive content. Another aspect describes encryption which is keyed to the disk ID to prevent playing oven illegally copied disk. Another aspect reads a specified amount of information then spins down the disk to conserve battery power.

23 Claims, 5 Drawing Sheets

COMPRESSED AUDIO INFORMATION

BACKGROUND

Audio and video information may be compressed to remove redundancy within the information. This allows the information to be stored using less memory. It is common to store audio as MP3 format which uses a reduced amount of memory. The advantage of storing the information is in this way is that a fixed amount of memory, such as available in a portable MP3 player or the like, may actually store more audio information.

MP3 players are commonly found in various types of computing devices. Stand-alone computers can play MP3's, as can Personal Digital Assistants (quote PDAs"), telephones, and other devices. Any electronic device which includes some kind of processing element can be used to read and write compressed audio and video information.

SUMMARY

The present invention teaches such applications which are made possible by the form of compressed information. According to an embodiment, extra information is stored within the compressed information. This extra information may be information that is associated with the information, or may be encryption information. In another embodiment, an improved way of storing this information is described.

BRIEF DESCRIPTION OF THE DRAWINGS

These and other aspects will now be described in detail with reference to the accompanying drawings, wherein.

DETAILED DESCRIPTION

While the present embodiment describes storing audio information in MP3 format, it should be understood that this is an embodiment of the general concepts described herein which are applicable to any kind of or format of either compressed audio information or compressed video information. Typically, the compressed file of the type described herein is compressed relative to the original size file representing the information. While the embodiment refers to MP3's, it should be understood that these techniques are also applicable to other formats including other compressed audio formats, compressed moving video formats such as MPEGs, compressed shingle image formats such as JPEG's and others.

Figure 1A:
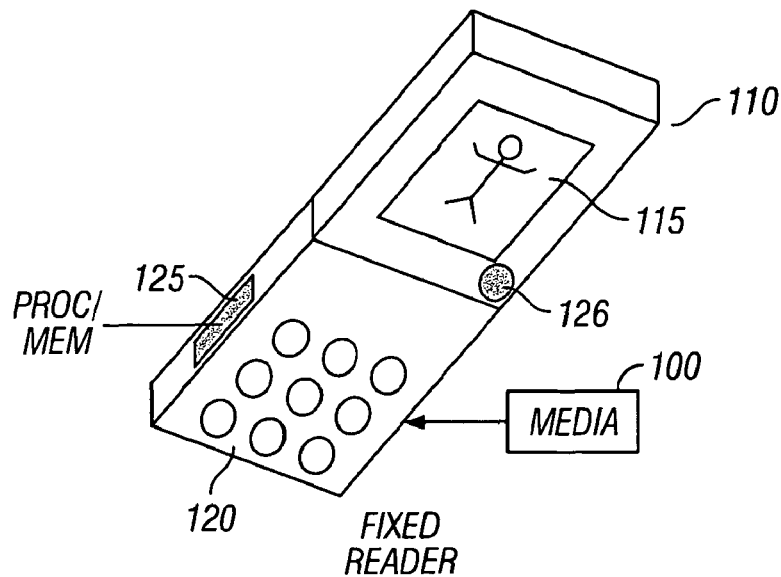
FIG. 1A shows a fixed media reader type of MP3 player.

There are basically two different types of readers for this compressed information. A fixed type reader is shown in FIG. 1A. In this reader, the memory media 100 is inserted into an electronic device which includes a processor 125 therein. FIG. 1A shows the device 110 as being a portable telephone. However, the device may be any device, portable or otherwise, that includes a processor therein. Various types of readers and media of this type are known. For example, the media 100 may be complex flesh, as the media, on memory stick (Sony) for others. The media is typically a relatively compact size nonvolatile storage memory.

The memory is read by the device, which typically includes display 115, user interface 120 which controls aspects of reading such as the track being read, and the processor/memory 125. The processor and memory 125 may decode the compressed MP3 information, and the decoded information is outputted to the reproduction hardware which may include a speaker 126 and/or display screen 115. This device is referred to herein as being a fixed reader, since the memory 100 is not moved during playback.

Figure 1B:
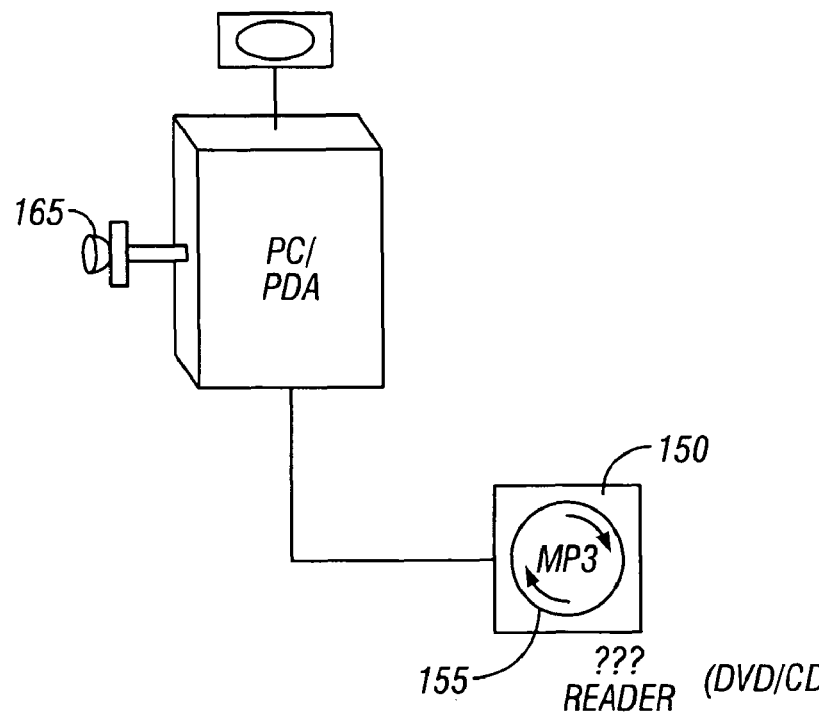
FIG. 1B shows a moving media typed reader for an MP3.

A second, moving type reader is shown in FIG. 1B. This device is effectively a legacy type device in which the information is spread over the surface of a physical part. A reading head is moved relative to the storage medium to obtain information from the different parts of the surface which store that information. The most common type of moving reader is a rotating disk reader. In this device, the MP3 information is stored on a round disk 155 which is rotated to receive the information therefrom. The reader 150 rotates the disk to receive the information which is sent to the PDA 160 and reproduced through the speakers. Other types of moving readers may include DVDs, mini disks, and other similar disk technology.

These compressed formats take up less space on the medium as compared with the uncompressed audio formats. This means, however, that the reader actually needs to read less data from the medium in order to reproduce the original data stream. For example, in order to play a specified one minute song, a moving reader 150 needs to read less data from an MP3 encoded disk 155, then it would need to read from a regular CD. The reader reads less data and therefore there is extra time between the reading.

In addition, the processors which are associated with these readers often include significant computing power. For example, in a cellular phone, the reader may include electronics which carry out cellular phone functions, analog to digital conversion, and other complicated mathematical operations. These electronics may have sufficient processing power to carry out many other functions. This is especially true when the reader of the MP3 information is also carrying out another functions such as a PDA or cellular telephone.

Figure 2:
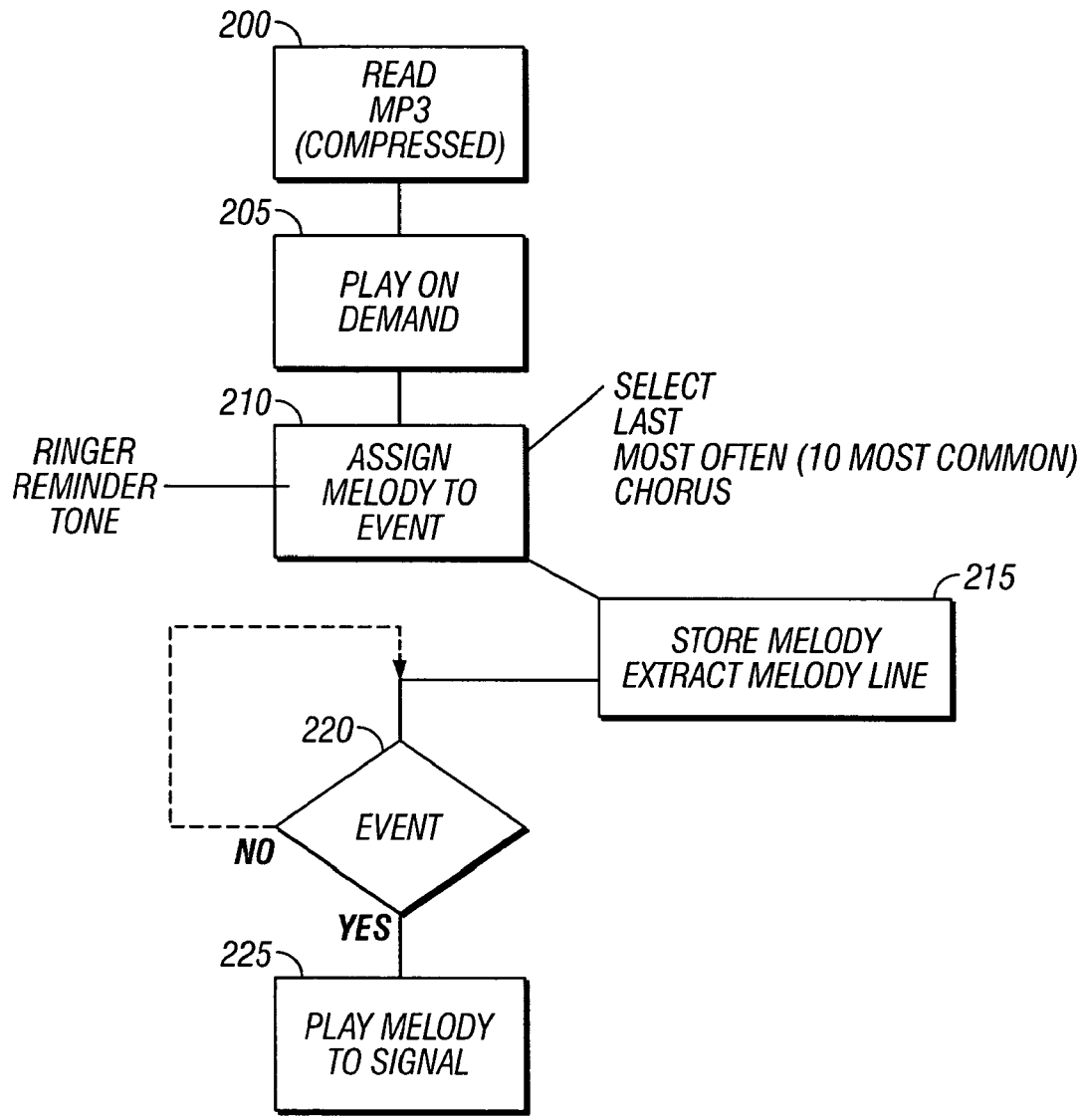
FIG. 2 shows a flowchart of a signing a specified melody to an event on a PDA or other personal computer.

According to an embodiment, the enhanced processing power is used for an additional function. An embodiment is described with reference to the flowchart of FIG. 2 which may be executed in any of the processors shown or described herein. This embodiment is intended to be used with a device/application which signals a user that an "event" has occurred. For example, when used in a cellular telephone embodiment, the "event" may be an incoming calls such as a ring tone in a conventional cellular telephone. In a PDA, the event may represent an appointment or other reminder for a user. A computer may signal the user about different events including ring tones, incoming faxes, reminders, and others. According to this embodiment, the information from the MP3 file is used as part of the signaling of the event.

The operation begins at 200 where the processor reads an MP3/compressed information. This information may represent a specific audio song being reproduced. 205 represents playing this information on demand. For example, there may be a play button or play function which signals the computer to play this information. At 210, a part of the MP3, referred to herein as a "melody", is assigned to the event. The melody that is assigned can be selected in many different ways. The Figure shows that the most often played melody may be selected. In this case, the system stores a list of the most commonly played melodies, and selects the most often played melody as the event reminder tone. Another alternative is that the last melody that was played becomes the event reminder tone. The melody that is played may actually be a clip from the MP3, or may be a melody line. At 215, the melody line may optionally be extracted. This is done by reviewing the compressed audio information to determine the actual tones representing the notes of the melody line. The fundamental frequency within the music notes may be determined, the melody line extracted, and this melody line stored as notes and times of those notes. Since this kind of storage requires only storage of musical notes and times, this storage may require relatively little memory. Each of the melody lines may be assigned with a numerical designation, for example.

One system may also find the "chorus" of the song being played. For example, this may be postulated as the most commonly repeating block of melody line. Alternatively, an artificial intelligence system may analyze the content of the song to find the most likely portion that represents the chorus. The system may also assign the chorus to the event in an embodiment. Again this chorus may be the chorus of the most often played song or simply the chorus of the last played song.

This system may therefore continuously vary the signal that is associated with the event. Alternatively, the user may simply manually assign information to the event. Also, if the compressed information includes video information, either MPEG video information or associated video information stored within the MP3 as described herein, then the signaling of the event may also includes a video segment.

At 220, the processing device monitors for the specific event. For example, the processor may monitor for an incoming telephone call, or may monitor for the time of reminder of the event. When the event is determined to occur at 220, the melody which is obtained at 210, 215 is played at 225.

In this way, the device, which already includes an MP3 player, may use information from the MP3 material to assign a specified melody to a specified event. That melody may be an actual clip of audio or video information, or may be an extracted melody line. The melody may be user selectable, automatically selected, or constantly changing.

As described above, since the data is compressed, there is less data to read for a given clip of musical information. Hence, the reader can actually read the material from the medium faster than it would be able to read from comparable uncompressed readers. This effectively gives the reader some spare time.

Figure 3:
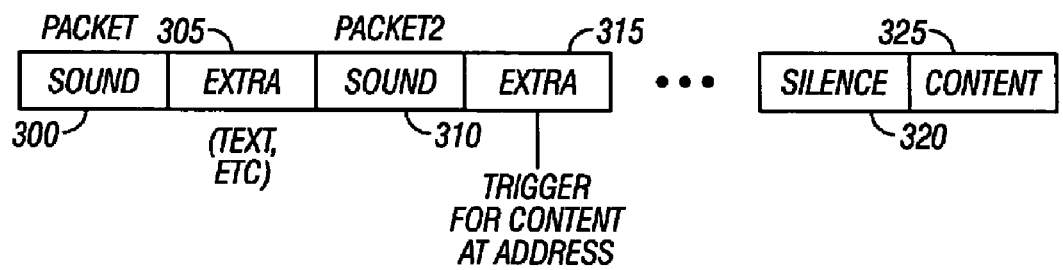
FIG. 3 shows a format of and MP3 which includes extra information therein.

In this embodiment, extra content is stored within the MP3, and the spare time is used to read and display this extra content. Existing formats such as MP3 already have the ability to store some extra content within the signal. For example, MP3 may store certain kinds of text about the signal being played. In this embodiment, the compressed information is in the format shown in FIG. 3. The sound is stored as packets 300, 310 and the like. Extra information may be interspersed between two adjacent packets. For example, extra information 305 may be stored between packet 1 and packet 2. Extra information such as 315 may be stored after packet 2. This may be done in conventional form, or may include additional area where more data can be stored.

The extra information such as 315 may be associated with the sound that is played at the time of the packet that comes after it. For example, while the sound at 310 is being played, the reader may also read the extra information 315. The specific extra information 315 may be played at the time of packet 310 and therefore represent content that is associated with packet 310. That information is played at the same time as the specific sound with which it is associated. The information 315 may not be the information itself, but may rather be an address indicating information that is somewhere else within the clip, or an address indicating some other destination for the information.

In addition, between two adjacent songs or programs there is often silence shown as 320. Additional content 325 may be stored during these silences between the tracks. Extra content may also be stored at the end of the entire information, for example after the end of the whole album.

The content to be played during the packet 2 (310) may not necessarily be stored in 315. Importantly, however, 315 stores some kind of trigger to play the content at address x. This content may rather be stored at 325, but triggered by the extra information at 315.

Figure 4:
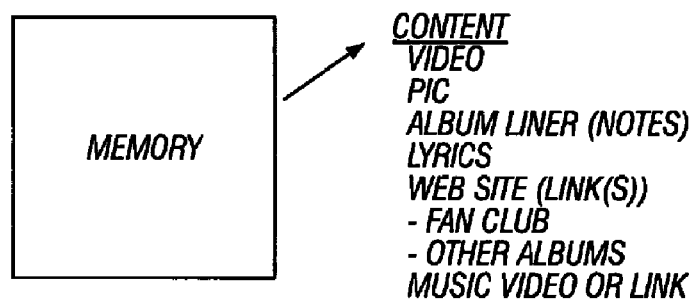
FIG. 4 shows different kinds of content which can exist within the extra information.
Figure 5:
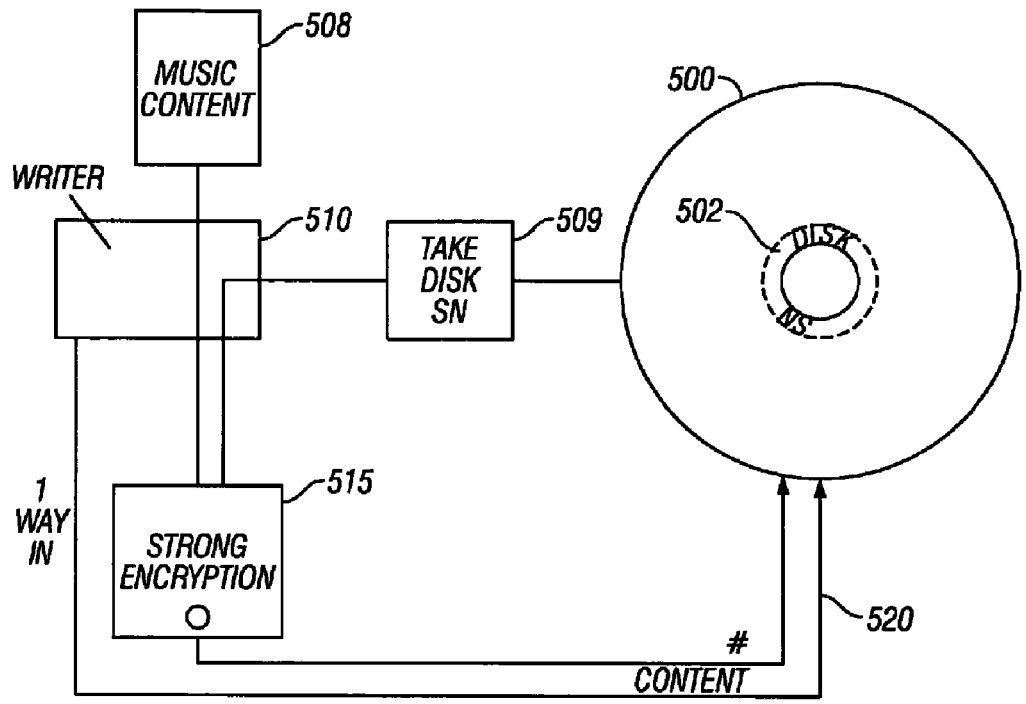
FIG. 5 shows an encryption system for an MP3.

The specific content is shown in FIG. 4. This content may include video information, still picture information, album liner type information such as notes, lyrics, web site links, and club links, links to information about other CDs or albums, and/or music videos for links to music videos. All of this information may be stored in multiple different resolutions, for example a first resolution for display on a PDA or telephone and a second resolution for display on a computer. The information may alternatively be stored as simply low resolution information with links to an Internet site that stores additional resolution information. In this case, the low resolution information may be displayed immediately, while the system first determines if the display is capable of displaying more detail. If so, then the system attempts to link to the broadband content to improve the resolution of the information which is displayed. The system may use a progressive scan type display where the first part of the display that is immediately displayed is a low resolution version, and this low resolution version is actually stored as part of the MP3. Additional information to improve the resolution may be obtained from the website link.

The extra information may simply be a link to date sensitive information. For example, it may be a link to the concert schedule for the artist that is playing the MP3 information. When the link is executed, the website storing this concert information is executed, thereby obtaining up to date, date sensitive information.

This information may be buffered, to be played at the time of the trigger 316. Alternatively, the reading may simply hop around from address to address to play the information in real time.

The computer which runs this decoder may be a standalone computer with an Internet connection, or may be a cellular telephone which has Internet via cellular capability.

A recurring concern with compressed music forms such as MP3s occurs because they are so relatively easy to copy. An abuser could easily copy the entire content of their particular music program to MP3 form, then post that to a web site or newsgroup. This effectively allows anyone with Internet access to download the MP3. Once someone buys a disk legitimately, that person can provide the content of the desk too many other people in this way. This pirating may cost revenues to the recording industry.

According to this embodiment, a technique is described which uses an encryption system to ensure that royalties are properly paid for such items. The encryption code may be part of the additional information stored as shown in FIG. 4. This system as shown in the context of a disk 500, however this may also be used with other media as described herein. As in other embodiments, this system can include a reader which includes electronics to read specified information from an optical disk.

In the embodiment, the disk has a unique serial number 502 which is provided by the manufacturer, and these unique to the specific disk. The processor takes this serial number at 504, as well as the music content 506 that is to be stored on the disk.

Figure 6:
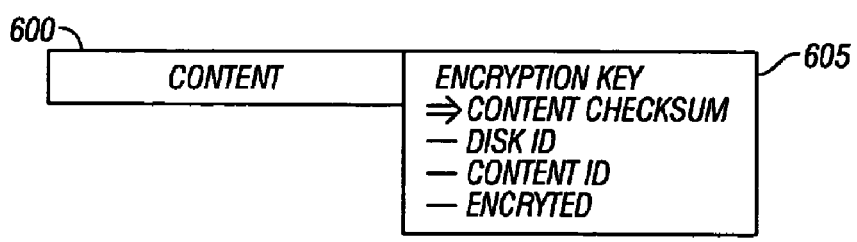
FIG. 6 shows the format of the encryption system.
Figure 7:
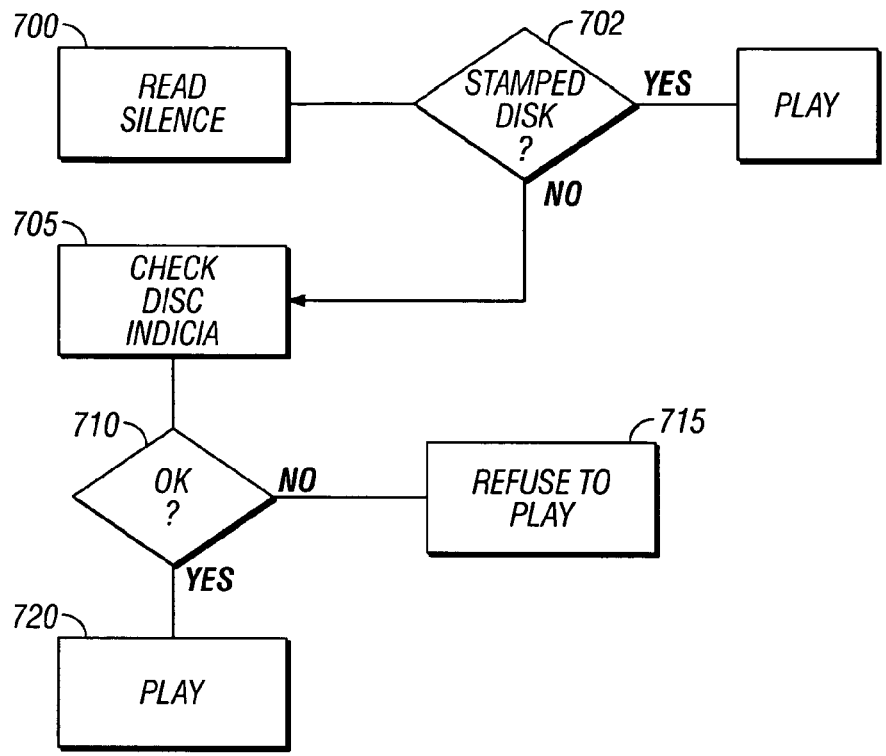
FIG. 7 shows a flowchart of reading the encryption system.

The writer 510 combines the disk serial number with the music content 506 using an encryption function shown as 515. For example, the encryption function as described herein may be a one-way function of a type that produces a large number. The theory of encryption using large numbers is well-established. Briefly speaking, usually this uses a factoring system where decoding to check the veracity of the large number is easy, but attempting to form of valid number surreptitiously is difficult. For example, a code may be selected which might require 35 years of brute force effort in order to form the codes surreptitiously. The large number 522 is then stored on the disk associated with the music content shown as 520. The code is therefore keyed to the content on the disk, in a form which may follow the content shown in FIG. 6. The content 600 may be mixed with encryption information 605 which may include an encryption key, content checksum, disk ID, content ID, and encrypted information.

In operation, the reader may operate to read the disk as well as reading information determining whether the disk is authorized. At 700, the system reads from the disk. Initially, a threshold test may be carried out at 702 determining if the disk is a stamped disk or some kind of recordable disk. A stamped disk may automatically be played in an embodiment, since these are so much more difficult to counterfeit. It is also difficult to individualize such stamped disks. However, in an alternative embodiment, a pre recorded disk may also be tested in a similar way.

If 702 determines that the currently played disk is not a stamped disk, then 705 may check the veracity of the encrypted number 522 on the disk using the local (public) key of a public key encryption system. This key may be stored locally in all readers, and using known cryptographic techniques, the knowledge of the decryption key tells you nothing about the encryption key. The accuracy may be tested only once, or may be tested every few seconds. If the result of the test is okay at 710, then the information is played at 720. If not, the reader may refuse to play the disk at 715.

This system may require that the cryptographic technology be added to all readers. However, this cryptographic technology may prevent surreptitious copying. In an embodiment, the system may allow the user to buy licenses for various MP3 technologies. When a license is purchased for specific technologies, the user is given an encrypted key or onetime use software that produces the encrypted key for one disk ID. For example, the user may upload the information, and received back information that includes the encryption information thereon. This may have significant advantages of allowing the system that assigns the key to determine who should get the royalties. Another embodiment may allow disks to be prepurchased which have a special key thereon enabling them to be written with MP3 information. The user pays for that special key much in the same way that they pay for any license. Of course, time IDs which allow the user to copy as many disks as they want in a specified time, or unlimited IDs, can also be purchased.

The above system has described this technique for use with MP3's and audio. However, the same techniques may be used for programs and computer information stored on disks. For example, a programs stored on a prerecorded disk may be automatically read, while a program stored on a recordable disk may require additional security information. This may also be used with a videodisc or any other type of entertainment media.

Figure 8:
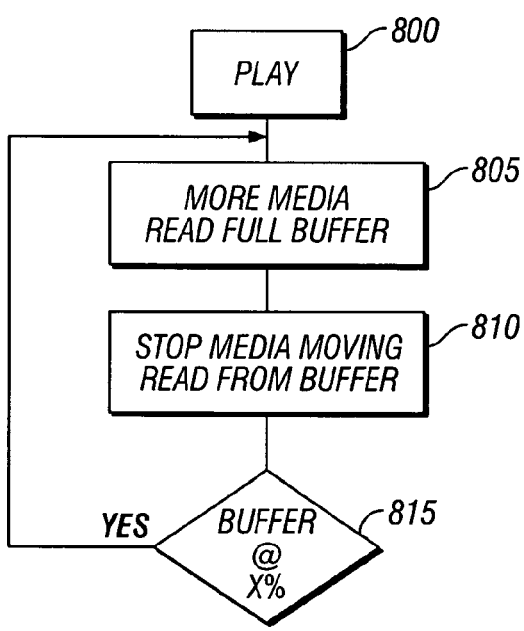
FIG. 8 shows another embodiment in which battery life can be preserved in a moving reader type of compressed information system.

Another embodiment, shown with reference to FIG. 8, relates mostly to moving media such as CDs and DVDs. MP3 is that are stored on this kind of moving media can convey the information much faster than is needed and as described above can provide spare capacity. However, this also means that the conventional moving techniques may be much more than necessary to play back the disk. When operating a portable device such as in MP3 reader that operates from a battery, the spinning of the disk may use a lot of the battery power. During playing, the media is conventionally continuously moved. This may waste battery power compared to what is really necessary to read the information from the disk. The embodiment shown at FIG. 8 may conserve battery power. At 800, a play command is received. This is followed by 805 which commands moving the media in a way that fills the buffer. The buffer may be for example a sufficient buffer to store five minutes of information. At this time, at 810, the media movement is terminated so that no further battery power is used to read the media. The system then proceeds to read from the buffer at 810. At 815, when the buffer reaches a specified percentage of emptiness (shown here as a percent) which may be 5 percent, the process repeats with the media being spun up, and reading occurring to fill the buffer.

This embodiment may also be usable with non compressed desks. For example, conventional CD readers read data at a specified rate often called 1×. However, readers which read much faster than this are well established. It is very simple for a reader to read at 40× as of this writing, and readers which read at even higher speeds are known and under development. Accordingly, this system may also be used with a reader that reads faster than 1×.

Although only a few embodiments have been disclosed in detail above, other modifications are possible. For example, and primarily, while the above refers primarily to MP3's, other compressed formats are equally applicable to this system. All such modifications are intended to be encompassed within the following claims, in which:

The invention claimed is:

1. A method, comprising:

using a computer for storing a compressed audio file representing music information on a medium, said compressed audio file stored as multiple separated groups of information representing music information that are played at times that are based on an order of said files on said medium, with an earlier file on said medium played before a later file on said medium; and using the computer for storing extra content associated with the compressed audio file, wherein said extra content includes non-audio information that is related to a content of the music information; and using the computer for storing information indicative of a point in time during a playing of the music information where said extra content should be played, where said information is capable of representing a different point in time than would be dictated by said order where said extra content is stored, wherein said extra content includes a first quantity of information on the medium that is played immediately, and an address to additional information that is not locally stored, and is played later after being received from said address and after playing at least a part of said first quantity of information, wherein said address is an internet address.

2. A method as in claim 1, wherein said extra content contains date sensitive information that is timely only within a specified date range.

3. A method as in claim 2, wherein said date sensitive information includes a link to a website that provides information that is date sensitive.

4. A method as in claim 1, wherein said storing compressed information and storing extra content comprises storing in a cellular telephone.

5. A method as in claim 1, wherein said storing compressed information and storing extra content comprises storing on a computer.

6. A method as in claim 1, wherein said extra content includes lyrics information about the music.

7. A method as in claim 1, and wherein said extra content is interspersed between multiple separated groups representing the music information.

8. A method, comprising:
    using a computer for storing a compressed audio file representing music information on a medium, said compressed audio file stored as multiple separated groups of information representing music information which is played at times related to positions of said groups of information on said medium, with an earlier file on said medium played before a later file on said medium; and
    using the computer for storing extra content associated with the compressed audio file, wherein said extra content includes non-audio information that is related to the content of the music information, and wherein said extra content is interspersed between multiple separated groups representing the music information on said medium, wherein said groups of music information are tracks, where each of said tracks defines a song or part of a song that is played in an order related to an order of said songs, where there is a time of silence between said tracks where no song information is stored and during which time where silence is intended to be played, and where said extra content is stored between said tracks of music information during said silence, and wherein said extra content includes a first quantity of information that is played immediately, and an address to additional information that is played later after being received from said address, wherein said address is an internet address.

9. A method as in claim 8, further comprising using the computer for storing information indicative of a point in time during a playing of the music information where said extra content should be played, where said information is capable of representing a different point in time than where said extra content is stored.

10. A method, comprising:
    using a computer for storing a compressed audio file representing music information on a medium, said compressed audio file stored as multiple separated groups of information representing music information that are played at times that are based on an order of said files on said medium, with an earlier file on said medium played before a later file on said medium; and
    using the computer for storing extra content associated with the compressed audio file, wherein said extra content includes non-audio information that is related to a content of the music information; and
    using the computer for storing information indicative of a point in time during a playing of the music information where said extra content should be played,
    where said information is capable of representing a different point in time than would be dictated by said order where said extra content is stored, wherein said extra content includes a first quantity of information on the medium that is played immediately, and an address to additional information that is not locally stored, and is played later after being received from said address and after playing at least a part of said first quantity of information,
    wherein said playing the extra content comprises using the computer for reading information from a local address representing an address of one of said groups that includes the music information, subsequently using the computer for reading information from said address of the additional information, and subsequently using the computer for reading from another address of said one of said groups, and wherein said local address of said one of said groups of music information is noncontiguous with said address of said additional information.

11. A method as in claim 10, further comprising using the computer for playing the extra content at the same time as playing audio associated with the music information.

12. A method as in claim 11, wherein said playing includes using the computer for storing said audio file and said additional information in memory areas near one another, and buffering first read information, and playing one of said information from said buffer at substantially the same time as the first read information.

13. A player for a storage medium, comprising:
    a player that plays a compressed audio file representing music information, said compressed audio file stored as multiple separated groups of information representing music information, and said player obtaining and playing music information by reading from said groups of information, said player playing said groups of information at times that are based on an order of said groups of information on said medium, with an earlier file on said medium being played before a later file on said medium; and
    said player also reading extra content associated with the compressed audio file, wherein said extra content includes non-audio information that is related to the content of the music information, where said extra content also includes information indicative of a point in time at during the playing of the music information where said extra content should be played,
    where said information is capable of representing a different point in time than would be dictated by said order where said extra content is stored, and said player also reading said extra content and producing an output indicative thereof, wherein said extra content includes a first quantity of information that is played immediately, and an address to additional information that is not locally stored and is played later after being received from said address and after playing at least a part of said first quantity of information,
    wherein said address is an address of a website, and said player obtains information from said website and produces said output based on said output from said website.

14. A player as in claim 13, wherein said extra content contains date sensitive information that is timely only within a specified date range.

15. A player as in claim 14, wherein said date sensitive information includes a link to a website that provides information that is date sensitive.

16. A player as in claim 13, wherein said player is in a cellular telephone.

17. A player as in claim 13, wherein said extra content includes lyrics information about the music.

18. A player as claim 13, wherein said player reads a first part of said information at a first resolution that is a lower resolution, and said additional information at said address includes second information from which higher resolution information can be obtained.

19. A player as in claim 13, and wherein said extra content is interspersed between multiple separated groups representing the music information.

20. A player for a storage medium, comprising:
a player that plays a compressed audio file representing music information, said compressed audio file stored as multiple separated groups of information representing music information on a medium, and said player obtaining and playing music information by reading from said groups of information from said medium, said music information which is played at times related to positions of said groups of information on said medium, with an earlier file on said medium played before a later file on said medium; and
said player also reading extra content associated with the compressed audio file, wherein said extra content includes non-audio information that is related to the content of the music information, and wherein said extra content is interspersed between multiple separated groups representing the music information on said medium, wherein said music information is arranged into tracks forming said groups, each of which defines a song or part of a song that is played in an order related to an order of said songs, where there is a time of silence between said tracks where no song information is stored and during which time where silence is intended to be played and said player plays said silence between said tracks, and said extra content is stored between said groups of music information during said silence, and said player plays said extra content, wherein said extra content includes a first quantity of information that is played immediately, and an address to additional information that is played later after being received from said address,
wherein said player plays the extra content by reading information from a local address representing an address of one of said groups that includes the music information, and subsequently the player reads information from said address of the additional information, and subsequently the player reads from another address of said one of said groups.

21. A player as in claim 20, wherein said player plays the extra content by reading information from a local address representing an address of one of said groups that includes the music information, and subsequently the player reads information from said address of the additional information, and subsequently the player reads from another address of said one of said groups.

22. A player as in claim 20, further comprising reading information indicative of a point in time during the playing of the music information where said extra content should be played, where said information is capable of representing a different point in time than where said extra content is stored, and playing said information at said point in time indicated by said information.

23. A player for a storage medium, comprising:
a player that plays a compressed audio file representing music information, said compressed audio file stored as multiple separated groups of information representing music information on a medium, and said player obtaining and playing music information by reading from said groups of information from said medium, said music information which is played at times related to positions of said groups of information on said medium, with an earlier file on said medium played before a later file on said medium; and
said player also reading extra content associated with the compressed audio file, wherein said extra content includes non-audio information that is related to the content of the music information, and wherein said extra content is interspersed between multiple separated groups representing the music information on said medium, wherein said music information is arranged into tracks forming said groups, each of which defines a song or part of a song that is played in an order related to an order of said songs, where there is a time of silence between said tracks where no song information is stored and during which time where silence is intended to be played and said player plays said silence between said tracks, and said extra content is stored between said groups of music information during said silence, and said player plays said extra content, wherein said extra content includes a first quantity of information that is played immediately, and an address to additional information that is played later after being received from said address, wherein said player reads said audio file and said additional information in memory areas near one another, and buffers first read information, and plays one of said information from said buffer at substantially the same time as said first read information.

* * * * *